Patented Apr. 6, 1954

2,674,582

UNITED STATES PATENT OFFICE 2,674,582

OXIDATION CATALYST

Joseph R. Darby, Webster Groves, Mo., assignor to Monsanto Chemical Company, St. Louis, Mo., a corporation of Delaware No Drawing. Original application July 1, 1949, Serial No. 102,699, now Patent No. 2,625,554, dated January 13, 1953. Divided and this application January 2, 1953, Serial No. 329,451

10 Claims. (Cl. 252—456)

This invention relates to an improved process for the vapor phase oxidation of benzene to maleic anhydride.

Various processes including the use of a large number of catalytic bodies have been suggested for use in the vapor phase oxidation of organic materials including the oxidation of benzene to maleic anhydride. While effective results are obtained by employing many of these processes and catalytic materials, there is still considerable room for improvement.

It is an object of this invention to provide an improved process for the vapor phase catalytic oxidation of benzene to maleic anhydride. A particular object of this invention is to provide an improved catalytic bed for the vapor phase oxidation of benzene.

According to the present invention, benzene is oxidized to maleic anhydride by contacting a mixture of benzene and oxygen with a bed of catalytic particles comprising a porous, inert carrier body composed of finely divided silica, the particles of which are bonded together by finely divided particles of a refractory glass which is low in basic constituents, said carrier being impregnated with a catalytically active material containing vanadium and substantially all the particles in said catalyst bed being of such a size as to be retained on a 6 mesh screen and at least the last 50% of said bed contacted by the reactants being made up substantially of particles of such a size as to pass through a 4 mesh screen. Thus it has been discovered that by employing a bed of catalytic particles of this size and composition, unexpectedly high yields of maleic anhydride are obtained.

The composition of the carrier body employed according to this invention is described and claimed in United States Patent 2,229,361 to Johann A. Bertsch. It comprises finely ground silica or material rich in silica mixed with a finely ground refractory glass of the "Pyrex" type, that is, one which is low in basic constituents such as sodium, potassium and calcium, and then heated to a temperature sufficient to soften the glass to obtain bodies suitable for catalyst carriers. These carriers are mechanically very hard and strong, substantially chemically inert when used in the catalytic oxidation of organic materials, and of sufficient porosity to absorb or otherwise hold and retain a catalytic material in relatively permanent association.

A highly convenient method of preparing such carriers comprises adding to the pulverized silica and glass a temporary and volatile binder which holds the material as a coherent mass during the preliminary stages of forming but disappears during calcination.

The preparation of the catalyst carrier composition is susceptible of numerous modifications. However, the following constitutes a specific example of one method which has been found to be highly satisfactory. Silica or a highly silicious material is ground or otherwise reduced to a relatively fine state, for example, to such state as to admit of its passage through a screen of 100-200 mesh and is then admixed with a suitable percentage (e. g. 15%) of ground and relatively refractory glass. A glass of high silica content is preferred. The glass should be relatively low in basic constituents since these tend to promote undesirable side reactions. The glass sold under the commercial name of "Pyrex," which consists mainly of silica, an amount of boron together with relatively small proportions of basic materials is found to be quite satisfactory. Common window glass, for example, is undesirable since it contains large proportions of basic constituents. These basic materials function as combustion catalysts and a catalytic mass containing appreciable proportions of them show an unsatisfactory conversion of the organic material to the desired product and large amounts of carbon dioxide and water are produced. The fineness of grinding of the glass may vary to a considerable extent but 100 mesh material is found to give good results.

After mixing for purposes of forming this composition into pellets suitable for calcination, it is desirable to add to the mixture of silica and ground glass a temporary binder, for example, an organic substance which, while it acts as a binder for the uncalcined material, is susceptible of volatilization without leaving an appreciable amount of residue in the final product. An excellent binder may be prepared by admixing stearic acid with cyclohexanol, the amount of the first being 1–2% by weight of the silica-pyrex mixture and that of the second being 15%. This binder when admixed with the silica-glass mixture forms a dough which can be easily molded into pellets or other convenient shapes.

An especially effective catalyst support is obtained by shaping the dough into small cylinders whose axes and diameters are of equal dimensions. Supports of this form are not subject to packing and give low resistance to the flow of gas. After the pellets have been formed they may be dried with air (preferably a stream of air) at a temperature of 100° C. When they are sufficiently dried to admit of handling, they are placed in an ordinary muffle furnace and burned at bright red heat for three to four hours. In this burning operation substantially all of the organic binder is evaporated or completely burned and there remain hard, refractory, porous, white, water insoluble, chemically inert pellets of very regular configuration.

The catalytic material may be applied to these pellets in any convenient manner. One method involves forming a solution of the soluble salts of catalysts for example, a saturated solution of ammonium vanadate and then applying the solution by spraying or dipping. The solution is absorbed into the pellet to give a highly intimate and permanent association between catalyst and carrier. A second method, which may be conveniently employed, involves merely dusting the pellets with finely ground catalytic material. A third method involves fusing the catalyst and then dipping the carrier pellets thereinto. In this last method it is found that the pellets act as sponges to take up the molten catalytic substances to give intimate and permanent association. If the catalyst is applied as a powder, it may be caused to enter into the pores of the carrier and thus to be intimately bonded thereto, by subjecting the pellets to a second step of calcination at a temperature sufficient to fuse the catalyst to the carrier. The intimacy of the bond between carrier and catalyst as obtained by spraying or dipping the carrier with solutions of the catalytic substances also may be intensified by heating the coated pellets to the fusion point of the deposited catalytic compound.

Components of glass may also be admixed with large amounts of silica, and this mixture upon heating will give a partially fused mass useful as a catalyst carrier.

In forming the catalyst it is desirable to leach the carrier pellet with a dilute acid solution, for example, hydrochloric acid, before impregnation with the catalytic material. According to one of the preferred embodiments of the invention, the carrier is leached with an acid solution, for example, a dilute, e. g. 5–10% aqueous solution of such acids as hydrochloric acid, sulfuric acid, maleic acid and other strong organic and inorganic acids having at least one hydrogen with a dissociation constant of at least $1 \times 10^{-4}$. The leaching is preferably carried out at an elevated temperature, e. g. 80–100° C., and continued until a fresh leaching solution develops little or no color. Thereafter the leached carrier is thoroughly washed with water, the last traces of acid neutralized by treating the carrier with a volatile base, e. g. immersing the carrier in an aqueous solution of such non-metallic bases as ammonia, ethanolamine, diethanolamine, triethanolamine, cyclohexylamine and other organic bases. Thereafter the carrier is thoroughly washed with water and dried.

The following examples are illustrative of the present invention but are not to be construed as limitative thereof.

*Example I*

Carrier pellets are prepared as described above in the form of small cylinders having an axis of about 0.16 inch in length and a diameter of about 0.16 inch. These pellets are coated with partially reduced vanadium pentoxide catalyst. A vertical reaction tube one-half inch in inside diameter and 80 inches long is filled with the coated pellets and a mixture of air and benzene in an approximate ratio of 1 pound of benzene to 15 pounds of air at a temperature of 450° C. is passed through this tube from top to bottom. It is found that maleic anhydride is produced in a high yield.

In contrast to the high yields of the process described above in Example I, when the same process is carried out except that the coated pellets used in Example I are replaced by coated pellets of similar shape but having axis and diameter dimensions of 0.22 inch instead of 0.16 inch, the yield of maleic anhydride is only 80% of that of Example I.

In further contrast to the process of the invention as exemplified by Example I, when the catalytic particles comprise coated carrier particles of smaller size, i. e., are too small to be retained by a 6 mesh screen, various difficulties arise in carrying out the process, for example there is a substantially higher pressure drop through the tube which adds to the expense and danger of the operation, the useful life of the catalyst is substantially shorter, etc.

As pointed out above, substantially all of the particles of catalyst in the catalyst bed are of such a size as to be retained by a 6 mesh screen and at least the last 50% of the bed contacted by the reactants, i. e. the gas mixture comprising benzene and oxygen is made up substantially of particles of such a size as to pass through a 4 mesh screen.

While all of the catalyst bed may be made up entirely, or substantially entirely, of particles which pass through a 4 mesh screen but are retained by a 6 mesh screen, as pointed out above up to 50% of the bed initially in contact with the reactants may be made up entirely, or substantially entirely, of larger particles, e. g. particles which pass through a 1 mesh screen and are retained by a 4 mesh screen. A more preferred range of larger particles are those which pass through a 3 mesh screen and are retained by a 4 mesh screen. According to a preferred embodiment of the invention the first 10–50% of the bed contacted by the reactants is made up substantially of such particles.

Thus, according to this embodiment of the invention, the portion of the catalytic mass that is initially contacted by the mixture of benzene and oxygen may be made up of large particles, i. e., particles retained by a 4 mesh screen, for example, cylindrically shaped particles having a diameter and an axis length of 0.22 inch. Thus, it is surprisingly discovered that even though the over-all length of the catalytic mass is not increased, the improved yields attained by the use of smaller catalytic particles are retained, while at the same time the pressure drop through the reaction tube is substantially lower.

The following example exemplifies the use of a catalytic mass in which the mixture of benzene and oxygen comes in contact initially with larger catalytic particles.

*Example II*

Example I is repeated except that the top half of the reaction tube is filled with coated carrier particles in which the axis and diameter dimensions are 0.22 inch instead of 0.16 inch. A similar yield of maleic anhydride is obtained while at the same time the pressure drop through the tube after 1000 hours of operation is only 2.5 pounds per square inch in contrast to 5 pounds per square inch in Example I. It is further discovered that the catalytic mass of the example has an even longer useful life than the catalytic mass employed in Example I.

The process of the invention is carried out by passing mixtures containing oxygen and benzene, for example, mixtures of air and benzene over catalytic particles comprising a vanadium catalyst dispersed on carrier particles having the composition and size characteristics set forth above. The catalytic mass or bed may be contained in any suitable vessel and such vessels may have varying shapes. However, for most purposes, it is generally preferred that the catalytic bed be contained in an elongated vessel as for example, a metallic tube such as a mild steel tube. These tubes may vary substantially in diameter and length depending upon the magnitude of the operations, for example from ½ inch to 3 inches or more in diameter and from 1 foot to 10 feet or more in length. It is to be understood, however, that the process of the invention is not limited to any particular size or shape of the catalytic bed.

The catalyst which may be employed according to the invention is a vanadium type catalyst, i. e., a vanadium oxide, e. g., vanadium pentoxide, partially reduced vanadium pentoxide, etc., or salt or other compound thereof and mixtures of such vanadium compounds and other metallic compounds, examples of which are known to those skilled in the art. Included among such auxiliary metal compounds are oxides and salts of aluminum, titanium, iron, cobalt, zinc, copper, nickel, molybdenum, magnesium, manganese, chromium etc. Usually the catalyst includes only a minor amount of auxiliary metal compound, for example, 2–20% based on the total amount of the catalyst and an even more preferred proportion is 5–15%.

In carrying out the oxidation of benzene, it is usually preferred that the oxygen be diluted by an inert gas and for this reason air is usually employed as the oxidizing medium. The ratio of air to benzene may be substantially varied but is usually within the range 6 to 30 pounds of air for each pound of benzene.

The oxidation process is carried out at elevated temperatures and usually temperatures in the range 300–600° C. are used, a preferred temperature range being 425–500° C.

The mesh sizes referred to herein are those of the Tyler Standard Screen Scale and are equivalent to the United States series. Thus, the 3 mesh size has an opening of 0.263 inch, the 4 mesh size has an opening of 0.185 inch and the 6 mesh size has an opening of 0.131 inch.

The catalytic particles of the invention may be made up in various configurations provided at least one dimension thereof is within the range of mesh sizes set forth above. Preferably, however, the particles are more or less uniform in shape, i. e. they more or less approximate spheres, cubes, cylinders and the like. As pointed out above a particularly useful shape is that obtained by forming the carrier composition into cylinders having axes and diameters of approximately equal dimensions. Catalyst beds made up of particles of varying configurations may also be used.

Preferably all of the particles in the catalyst bed are of the size given hereinbefore but the improved results of the invention are essentially attained even though a few percent e. g. 1–10% by weight of the particles are outside of the above limits, particularly if such particles are relatively uniformly distributed through the bed.

This application is a division of my copending application Serial Number 102,699, filed July 1, 1949, now Patent No. 2,625,554.

What is claimed is:

1. A catalyst for the vapor phase oxidation of benzene to maleic anhydride which comprises a porous, inert mass of finely subdivided silica, the particles of which are bonded together by a matrix of a refractory glass which is high in silica and low in basic constituents, the bonded silica particles being impregnated with a catalytically active material containing vanadium, the portion of the catalystic bed which is to be in initial contact with the mixture of benzene and oxygen being made up substantially of particles of such a size as to be retained by a 4 mesh screen and the balance of the bed being made up substantially of particles of such a size as to pass through a 4 mesh screen and be retained by a 6 mesh screen.

2. A catalyst as defined in claim 1 in which the catalytic particles are cylindrical in shape and have axes and diameters of substantially equal dimensions.

3. A catalyst for the vapor phase oxidation of benzene to maleic anhydride which comprises a bed of particles comprising a porous, inert carrier body composed of finely divided silica, the particles of which are bonded together by finely divided particles of a refractory glass which is low in basic constituents, said carrier being impregnated with a catalytically active material containing vanadium and substantially all of the particles of said bed being of such a size as to be retained by a 6 mesh screen and at least the last 50% of said bed to be contacted by the reactants being made up substantially of particles of such a size as to pass through a 4 mesh screen and be retained by a 3 mesh screen.

4. A catalyst as defined in claim 3 in which substantially all of the particles are substantially uniform in shape.

5. A catalyst as defined in claim 4 in which the carrier particles are cylindrical in shape and have axes and diameters of substantially equal dimensions.

6. A catalyst as defined in claim 5 in which the catalytically active material comprises partially reduced vanadium oxide.

7. A catalyst as defined in claim 3 in which the catalytically active material comprises partially reduced vanadium oxide.

8. A catalyst as defined in claim 7 in which the initial 10–50% of the catalyst bed is made up substantially of the larger particles and the balance substantially of the smaller particles.

9. A catalyst as defined in claim 1 in which the catalytically active material comprises partially reduced vanadium oxide.

10. A catalyst as defined in claim 1 in which the initial 10–50% of the catalytic bed is made up substantially of the larger particles and the balance substantially of the smaller particles.

References Cited in the file of this patent

UNITED STATES PATENTS

| Number | Name | Date |
|---|---|---|
| 2,510,803 | Cooper | June 6, 1950 |
| 2,625,554 | Darby | June 13, 1953 |